US009626295B2

United States Patent
Park et al.

(10) Patent No.: US 9,626,295 B2
(45) Date of Patent: Apr. 18, 2017

(54) SYSTEMS AND METHODS FOR SCHEDULING TASKS IN A HETEROGENEOUS PROCESSOR CLUSTER ARCHITECTURE USING CACHE DEMAND MONITORING

(71) Applicant: QUALCOMM INCORPORATED, San Diego, CA (US)

(72) Inventors: Hee Jun Park, San Diego, CA (US); Bohuslav Rychlik, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 4 days.

(21) Appl. No.: 14/807,840

(22) Filed: Jul. 23, 2015

(65) Prior Publication Data

US 2017/0024316 A1    Jan. 26, 2017

(51) Int. Cl.
*G06F 12/08* (2016.01)
*G06F 12/084* (2016.01)
(Continued)

(52) U.S. Cl.
CPC .......... *G06F 12/084* (2013.01); *G06F 9/5088* (2013.01); *G06F 12/0815* (2013.01); *G06F 2212/314* (2013.01); *G06F 2212/621* (2013.01)

(58) Field of Classification Search
CPC .............. G06F 12/084; G06F 12/0815; G06F 2212/621; G06F 2212/314; G06F 9/5088
(Continued)

(56) References Cited

U.S. PATENT DOCUMENTS 6,604,174 B1 * 8/2003 Dean ................... G06F 12/0844
                                                        711/118
8,635,405 B2 * 1/2014 Nishihara ............. G06F 9/5088
                                                        711/119
(Continued)

FOREIGN PATENT DOCUMENTS

EP         2894565 A1    7/2015

OTHER PUBLICATIONS

Knauerhase et al., "Using OS observations to improve performance in multicore systems," IEEE Computer Society—Architecture-OS interaction, 2008, pp. 54-66.
(Continued)

*Primary Examiner* — Jasmine Song
(74) *Attorney, Agent, or Firm* — Smith Tempel

(57) ABSTRACT

Systems, methods, and computer programs are disclosed for scheduling tasks in a heterogeneous processor cluster architecture in a portable computing device. One embodiment is a system comprising a first processor cluster and a second processor cluster. The first processor cluster comprises a first shared cache, and the second processor cluster comprises a second shared cache. The system further comprises a controller in communication with the first and second processor clusters for performing task migration between the first and second processor clusters. The controller initiates execution of a task on a first processor in the first processor cluster. The controller monitors a processor workload for the first processor and a cache demand associated with the first shared cache while the task is running on the first processor in the first processor cluster. The controller migrates the task to the second processor cluster based on the processor workload and the cache demand.

23 Claims, 8 Drawing Sheets

(51) Int. Cl.
   *G06F 12/0815*   (2016.01)
   *G06F 9/50*      (2006.01)
(58) Field of Classification Search
   USPC .......................................................... 711/130
   See application file for complete search history.

(56) References Cited

U.S. PATENT DOCUMENTS 8,782,649 B2      7/2014   Jeong
   8,793,686 B2 *    7/2014   Aasheim ............. G06F 9/45558
                                                            718/1
   2004/0215987 A1   10/2004  Farkas et al.
   2005/0013705 A1    1/2005  Farkas et al.
   2006/0168571 A1    7/2006  Ghiasi et al.
   2008/0263324 A1   10/2008  Sutardja et al.

OTHER PUBLICATIONS

International Search Report and Written Opinion—PCT/US2016/039432—ISA/EPO—Sep. 22, 2016 (152339WO).

* cited by examiner

| PROCESSOR WORKLOAD DATA 202 | CACHE DEMAND DATA 204 | SCHEDULER OUTPUT 302 |
|---|---|---|
| > THRESHOLD #1 | > THRESHOLD #2 | MIGRATE TASK TO A BIG CPU AT HIGH PRIORITY |
| > THRESHOLD #1 | < THRESHOLD #2 | MIGRATE TASK TO A BIG CPU AT MEDIUM PRIORITY |
| < THRESHOLD #1 | > THRESHOLD #2 | MIGRATE TASK TO A BIG CPU AT MEDIUM PRIORITY |
| < THRESHOLD #1 | < THRESHOLD #2 | MIGRATE TASK TO A LITTLE CPU |

*FIG. 3*

SYSTEMS AND METHODS FOR SCHEDULING TASKS IN A HETEROGENEOUS PROCESSOR CLUSTER ARCHITECTURE USING CACHE DEMAND MONITORING

DESCRIPTION OF THE RELATED ART

Portable computing devices (e.g., cellular telephones, smart phones, tablet computers, portable digital assistants (PDAs), and portable game consoles) continue to offer an ever-expanding array of features and services, and provide users with unprecedented levels of access to information, resources, and communications. To keep pace with these service enhancements, such devices have become more powerful and more complex. Portable computing devices now commonly include a system on chip (SoC) comprising one or more chip components embedded on a single substrate (e.g., one or more central processing units (CPUs), a graphics processing unit (GPU), digital signal processors, etc.).

Such portable computing devices or other computer systems or devices may comprise a heterogeneous processor cluster architecture, an example of which is referred to as a "big.LITTLE" heterogeneous architecture. The "big-.LITTLE" and other heterogeneous architectures typically comprise a group of processor cores in which a set of relatively slower, lower-power processor cores are coupled with a set of relatively more powerful processor cores. For example, a set of processors or processor cores with a higher performance ability are often referred to as the "Big cluster" while the other set of processors or processor cores with minimum power consumption yet capable of delivering appropriate performance (but relatively less than that of the Big cluster) is referred to as the "Little cluster." A cache controller may schedule tasks to be performed by the Big cluster or the Little cluster according to performance and/or power requirements, which may vary based on various use cases. The Big cluster may be used for situations in which higher performance is desirable (e.g., graphics, gaming, etc.), and the Little cluster may be used for relatively lower power user cases (e.g., text applications).

Existing heterogeneous processor cluster architectures may migrate tasks between the Big and Little clusters based on CPU utilization or CPU loading. For example, the cache controller may monitor CPU processing latency, instruction execution times, etc. while a task is running on a Little cluster and, if CPU utilization is deemed high, the task may be migrated to the Big cluster. However, existing task migration schemes have no way of determining whether high CPU utilization is caused by CPU load or, for example, cache misses. Furthermore, existing task migration schemes are unable to migrate tasks of various types.

Accordingly, there is a need in the art for improved systems and methods for migrating tasks in a heterogeneous processor cluster based on CPU loading and cache demand.

SUMMARY OF THE DISCLOSURE

Various embodiments of methods, systems, and computer programs are disclosed for scheduling tasks in a heterogeneous processor cluster architecture in a portable computing device. One embodiment is a system comprising a first processor cluster and a second processor cluster. The first processor cluster comprises a first shared cache, and the second processor cluster comprises a second shared cache. The system further comprises a controller in communication with the first and second processor clusters for performing task migration between the first and second processor clusters. The controller initiates execution of a task on a first processor in the first processor cluster. The controller monitors a processor workload for the first processor and a cache demand associated with the first shared cache while the task is running on the first processor in the first processor cluster. The controller migrates the task to the second processor cluster based on the processor workload and the cache demand.

Another embodiment is method for scheduling tasks in a heterogeneous processor cluster architecture in a portable computing device. The method comprises running a task on a first processor in a first processor cluster in a heterogeneous processor cluster architecture comprising the first processor cluster having a first shared cache and a second processor cluster having a second shared cache. While the task is running on the first processor in the first processor cluster, a processor workload for the first processor and a cache demand associated with the first shared cache are monitored. Based on the processor workload and the cache demand, the task is migrated to the second processor cluster.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

FIG. 3 is a data table illustrating exemplary data inputs and resulting data outputs of the scheduler in FIG. 2.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" or "image" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Figure 1:
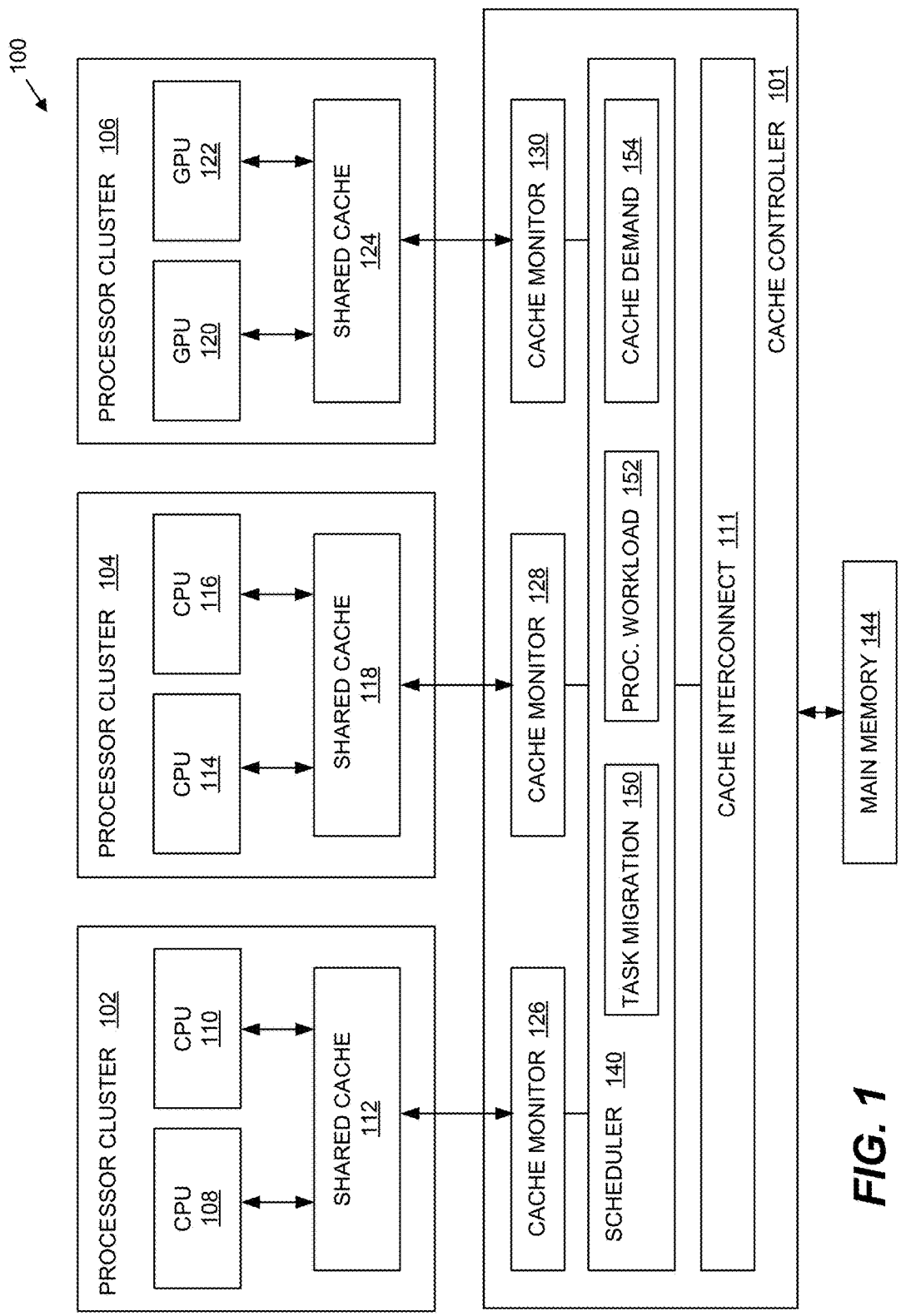
FIG. 1 is a block diagram of an embodiment of a system for scheduling tasks in a heterogeneous processor cluster architecture.

FIG. 1 is a block diagram of an embodiment of a system 100 comprising a heterogeneous processor cluster architecture. The system 100 may be implemented in any computing device, including a personal computer, a workstation, a server, a portable computing device (PCD), such as a cellular telephone, a portable digital assistant (PDA), a portable game console, a palmtop computer, or a tablet computer. The heterogeneous processor cluster architecture comprises a plurality of processor clusters coupled to a cache controller 101. As known in the art, each processor cluster may comprise one or more processors or processor cores (e.g., central processing unit (CPU), graphics processing unit (GPU), digital signal processor (DSP), etc.) with a corresponding shared cache.

In the embodiment of FIG. 1, the processor clusters 102 and 104 may comprise a "big.LITTLE" heterogeneous architecture, as described above, in which the processor cluster 102 comprises a Little cluster and the processor cluster 104 comprises a Big cluster. The Little processor cluster 102 comprises a plurality of central processing unit (CPU) cores 108 and 110, which are relatively slower and consume less power than the CPU cores 114 and 116 in the Big processor cluster 104. It should be appreciated that the Big cluster CPU cores 114 and 116 may be distinguished from the Little cluster CPU cores 108 and 110 by, for example, a relatively higher instructions per cycle (IPC), higher operating frequency, and/or having a micro-architectural feature that enables relatively more performance but at the cost of additional power. Furthermore, additional processor clusters may be included in the system 100, such as, for example, a processor cluster 106 comprising GPU cores 120 and 122.

Processor clusters 102, 104, and 106 may have independent shared cache memory used by the corresponding processors in the cluster to reduce the average time to access data from a main memory 144. In an embodiment, the shared cache memory and the main memory 144 may be organized as a hierarchy of cache levels (e.g., level one (L1), level two (L2), level three (L3). In the embodiment illustrated in FIG. 1, the processor cluster 102 comprises a shared cache 112 dedicated to CPUs 108 and 110. Processor cluster 104 comprises a shared cache 118 dedicated to CPUs 114 and 116, and processor cluster 106 comprises a shared cache 124 dedicated to GPUs 120 and 122. It should be appreciated that the shared cache may be implemented with or without a hierarchy of cache levels.

As illustrated in FIG. 1, the cache controller 101 may comprise a scheduler 140, a cache interconnect 111, and a plurality of cache monitors 126, 128, and 130 for monitoring the performance of shared cache 112, 118, and 124, respectively. Cache interconnect 111 comprises an interconnect or bus with associated logic for maintaining coherency between main memory 144 and the shared cache. The scheduler 140 includes a task migration component 150 for performing task migration between the processor clusters 102, 104, and 106. As described below in more detail, the task migration component 150 is configured to determine task migration by monitoring the workload of the cluster processor(s) (processor workload profiler 152) and the cache demand of each shared cache (cache demand profiler 154). The processor workload profiler 152 may determine processor or CPU utilization, loading, processing latency, instruction execution times, etc. The cache demand profiler 154 may monitor memory access (read and/or write access) to shared cache 112, 118, and 124 and determine delays due to, for example, cache misses that may impact the performance of current task running on the cluster processors or cores.

Figure 2:
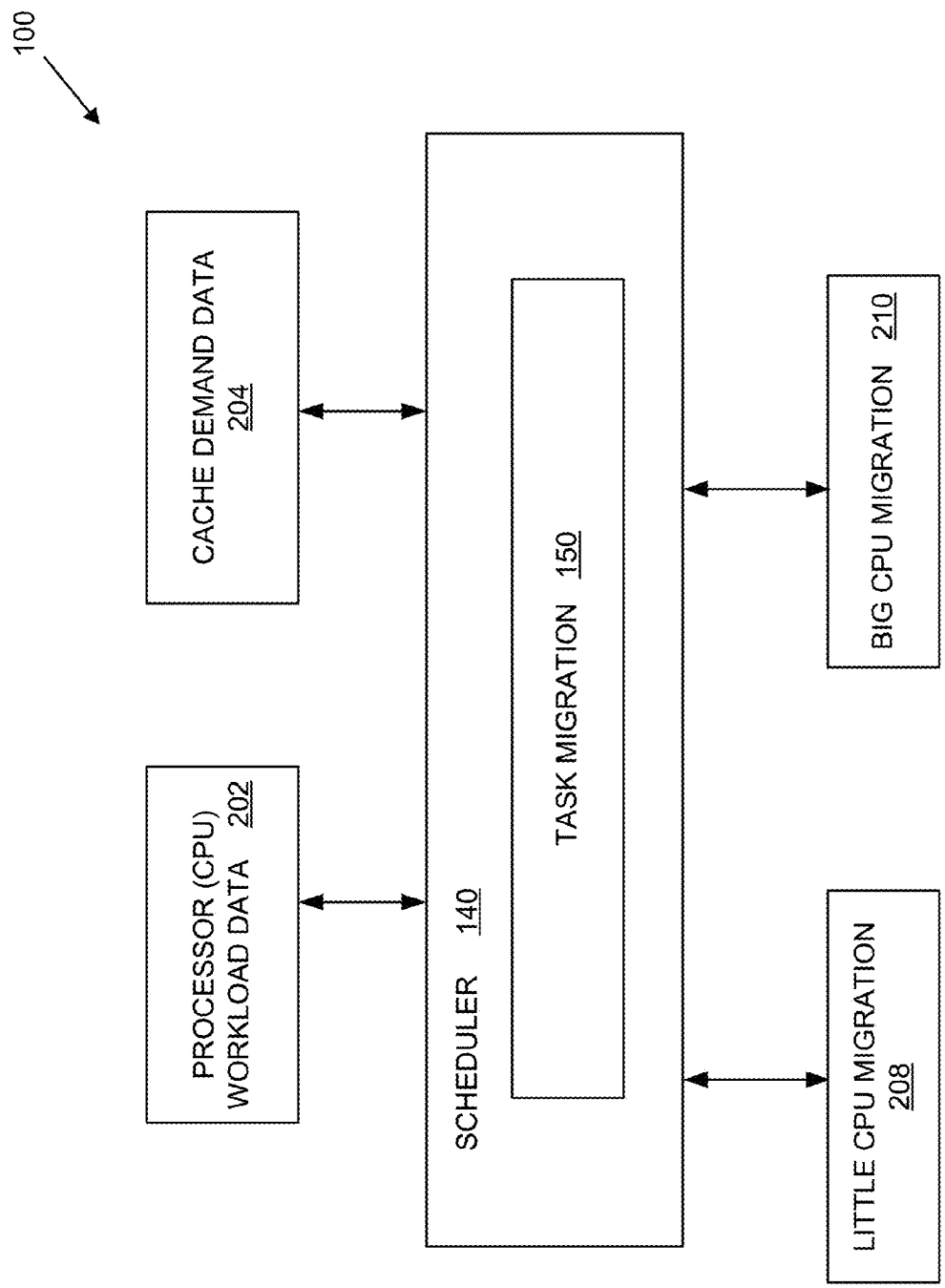
FIG. 2 is a block diagram illustrating the data inputs and outputs of an embodiment of the scheduler in the system of FIG. 1.

FIG. 2 is a block diagram illustrating the data inputs and outputs of an embodiment of the scheduler 140. The scheduler 140 may receive as data inputs processor workload data 202 from each processor and cache demand data 204 associated with each shared cache. It should be appreciated that the processor workload data 202 may comprise any available usage data, including, one or more of the following or other parameters received from processor cores: instructions per cycle (IPC), million instructions per second (MIPS), frequency, CPU active duration percentage. The cache demand data 204 may comprise, for example, cache workload or performance information based on one or more of the following or other parameters received via cache monitors 126, 128, and 130: cache misses per 1000 instructions (MPKI), cache accesses per 1000 instructions (APKI), cache miss rate (MPKI/APKI), CPU stall time/ratio or stall clocks due to cache misses, and million cycles per second (MCPS) indicating an amount of CPU stalls due to cache misses. Based on the input data 202 and 204, the scheduler 140 accurately schedules tasks and determines based on per-task CPU loading and cache demand whether performance may be improved by migrating the task to another processor core or cluster. In an embodiment, a current task may be migrated to a Little CPU (block 208) or a Big CPU (block 210).

As illustrated in FIG. 3, the scheduler 140 may access and manage a table 300 that defines a plurality of predefined or configurable thresholds for controlling per-task migration. It should be appreciated that the data contained in table 300 may comprise input data 202 and 204 and output data 302 for each task (i.e., per task). In the embodiment of FIG. 3, a first threshold (threshold #1) may define a threshold related to processor workload data 202, and a second threshold (threshold #2) may define a threshold related to cache demand data 204. In an embodiment, cache demand data 204 may be calculated from a cache miss rate, a CPU stall ratio (e.g., time %), or other data and/or counts that represent cache demand. Column 302 defines the scheduler output on a per-task basis as a function of the monitored and/or estimated processor workload data 202 and cache demand data 204 for a current task running on the system 100. Table 300 defines four usage scenarios based on threshold #1 and #2. In scenario 1, if the processor workload exceeds threshold #1 and the cache demand exceeds threshold #2, the scheduler 140 may determine that the current task should be migrated to a processor or core in the Big cluster and assigned a priority value of "HIGH". In scenario 2, if the processor workload exceeds threshold #1 and the cache demand does not exceed threshold #2, the scheduler 140 may determine that the current task should be migrated to a processor or core in the Big cluster and assigned a priority value of "MEDIUM". In scenario 3, if the processor workload does not exceed threshold #1 but the cache demand exceeds threshold #2, the scheduler 140 may determine that the current task should be migrated to a processor or core in the Big cluster and assigned a priority value of "MEDIUM". In scenario 3, the scheduler 140 may calculate a weighted sum of the processor workload data 202 and the cache demand data 204. In scenario 4, if the processor workload does not exceed threshold #1 and the cache demand does not exceed threshold #2, the scheduler 140 may determine that the current task should be migrated to a processor or core in the Little cluster. One of ordinary skill in the art will appreciate that task migration to the Big cluster may be implemented with or without a priority scheme, and that table 300 may be configured to manage one or more thresholds for determining task migration between the Little and Big clusters.

Figure 4:
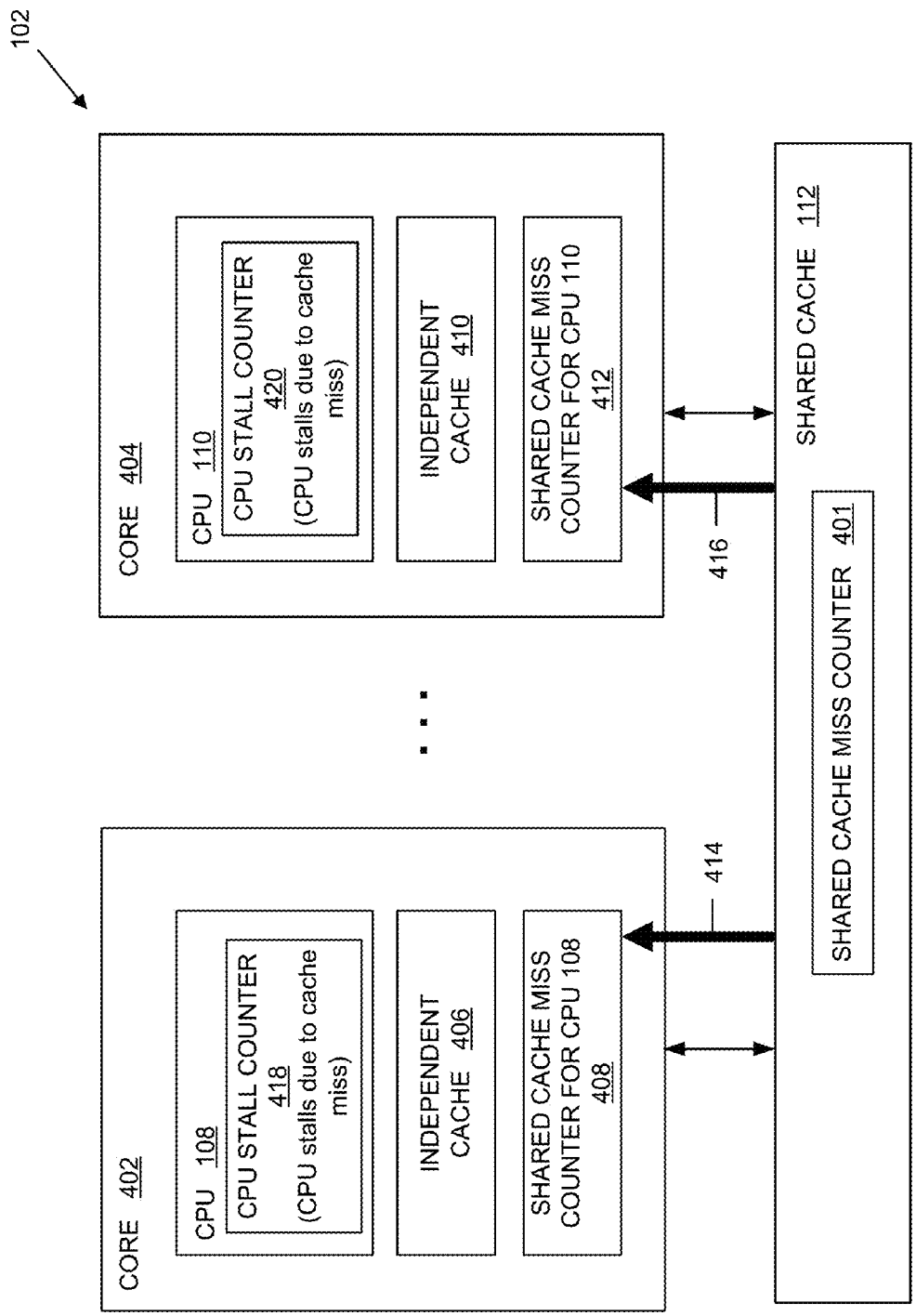
FIG. 4 is a block diagram illustrating an embodiment of a processor cluster in which each processor core comprises a dedicated cache miss counter.

FIG. 4 illustrates an embodiment in which task migration is implemented using a cache miss counter for each processor core. As illustrated in FIG. 4, the processor cluster 102 may comprise a plurality of processor cores 402 and 404 having a shared cache 112. Processor core 402 comprises CPU 108, an independent cache 406, and a dedicated cache miss counter 408 for the CPU 108. Processor core 404 comprises CPU 110, an independent cache 410, and a dedicated cache miss counter 412 for CPU 110. It should be appreciated that independent cache 406 and 410 may be implemented where a hierarchy of cache levels is used. The dedicated cache miss counters 408 and 412 may comprise hardware counters or may be implemented in software. In operation, when a core is accessing the shared cache 112 for read or write operations, a cache miss signal may be sent to the corresponding dedicated cache miss counter. Cache miss signal(s) 414 associated with tasks running on CPU 108 may be provided to dedicated cache miss counter 408 from a global shared cache miss counter 401 residing in the shared cache 112. Cache miss signal(s) 416 associated with tasks running on CPU 110 may be provided to dedicated cache miss counter 412. In this manner, each processor in the processor cluster 102 may maintain a cache miss profile, which may be used to accurately control task migration based on both CPU loading and cache demand.

As further illustrated in FIG. 4 and discussed above, each CPU in the processor cluster 102 may further comprise a CPU stall counter. In the embodiment of FIG. 4, CPU 108 comprises a CPU stall counter 418, and CPU 110 comprises a CPU stall counter 420. CPU stall counters 418 and 420 may measure and indicate a CPU stall duration due to cache misses. For example, in the event of a cache hit, the corresponding CPU may immediately read or write, in which case there is minimal to no CPU stall time. When a cache miss occurs, however, the corresponding CPU may wait for data coming from the external main memory, in which case there is a CPU stall time during which the CPU is not executing instructions. It should be appreciated that data from the cache miss counters 408, 412, and 401 and the CPU stall counters 418 and 420 may be used as input information to the scheduler 140.

Figure 5:
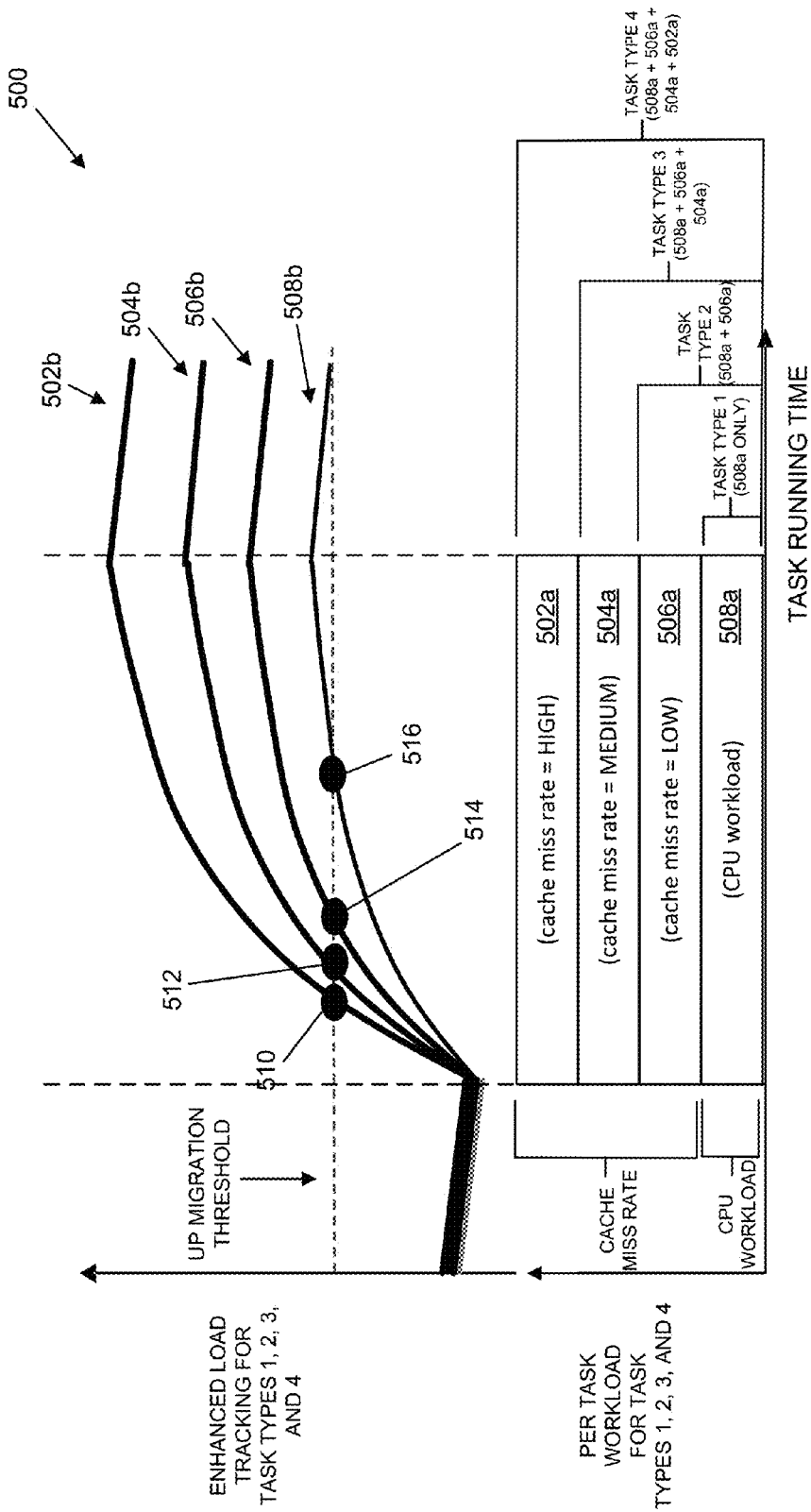
FIG. 5 is a graphical representation of task migration in the system of FIG. 1 based on a plurality of task types.

FIG. 5 illustrates an embodiment for implementing enhanced load tracking with task migration based on the combination of CPU workload and cache demand. Enhanced load tracking may incorporate both CPU workload and cache demand and employ thresholds for each as described above. In other embodiments, enhanced load tracking calculate a sum of CPU workload and cache demand or a weighted sum of (CPU workload)×(coefficient a)+(cache demand)×(coefficient b). A first geometric series (Equation 1) may be calculated to estimate the tracked load of CPU workload.

$$S = u_0 + u_1 * y + u_2 * y^2 + u_3 * y^3 + u_4 * y^4 + \ldots + u_{(n-1)} * y^{(n-1)}$$

y: coefficient between 0 and 1
$u_i$: between 0 or 1 indicating CPU activity (or utilization) at time i, wherein time 0=latest/newest and time (n−1)=oldest time
n=# processor cores in cluster Equation 1: CPU Workload A second geometric series may be calculated (Equation 2) to estimate the tracked load of cache workload.

$$X = v_0 + v_1 * z * v_2 * z^2 + v_3 * z^3 + v_4 * z^4 + \ldots + v_{(n-1)} * z^{(n-1)}$$

z: coefficient between 0 and 1
$v_i$: between 0 or 1 indicating cache miss ratio at time I, wherein time 0=latest/newest and time (n−1)=oldest time
n=# processor cores in cluster Equation 2: Cache Workload If the sum of S (Equation 1) and X (Equation 2) or the weighted sum exceeds a threshold, the task migration component 150 may determine that the current task is to be migrated to the Big cluster.

Enhanced load tracking may be configured to support various different types of tasks. In the example of FIG. 5, the task running time for four different types of tasks is illustrated. Task type 1 (block 508a) comprises a predefined CPU workload. Task type 2 (block 506a) comprises a cache miss rate having a "LOW" value. Task type 3 (block 504a) comprises a cache miss rate having a "MEDIUM" value. Task type 4 (block 502a) comprises a cache miss rate having a "HIGH" value a. The graph 500 illustrates an exemplary tracked load for each task type. Line 502b corresponds to task type 4 (block 502a). Line 504b corresponds to task type 3 (block 504a). Line 506b corresponds to task type 2 (block 506a). Line 508b corresponds to task type 1 (block 508a).

As further illustrated in FIG. 5, an "up migration" threshold defines the level at which the different task types running on the Little CPU would be migrated to the Big CPU. Referring to line 502b, task type 4 is migrated first (reference numeral 510) because it has the highest cache miss rate. Task type 3 is migrated second (reference numeral 512). Task type 2 is migrated third (reference numeral 514). Task type 1 is migrated last (reference numeral 516). It should be appreciated that existing solutions are incapable of distinguishing different tasks types 1, 2, 3, and 4. By comparison, in existing solutions and unlike system 100, task migration for all four task types may resemble line 516, which is not an efficient scheduling result.

Figure 6:
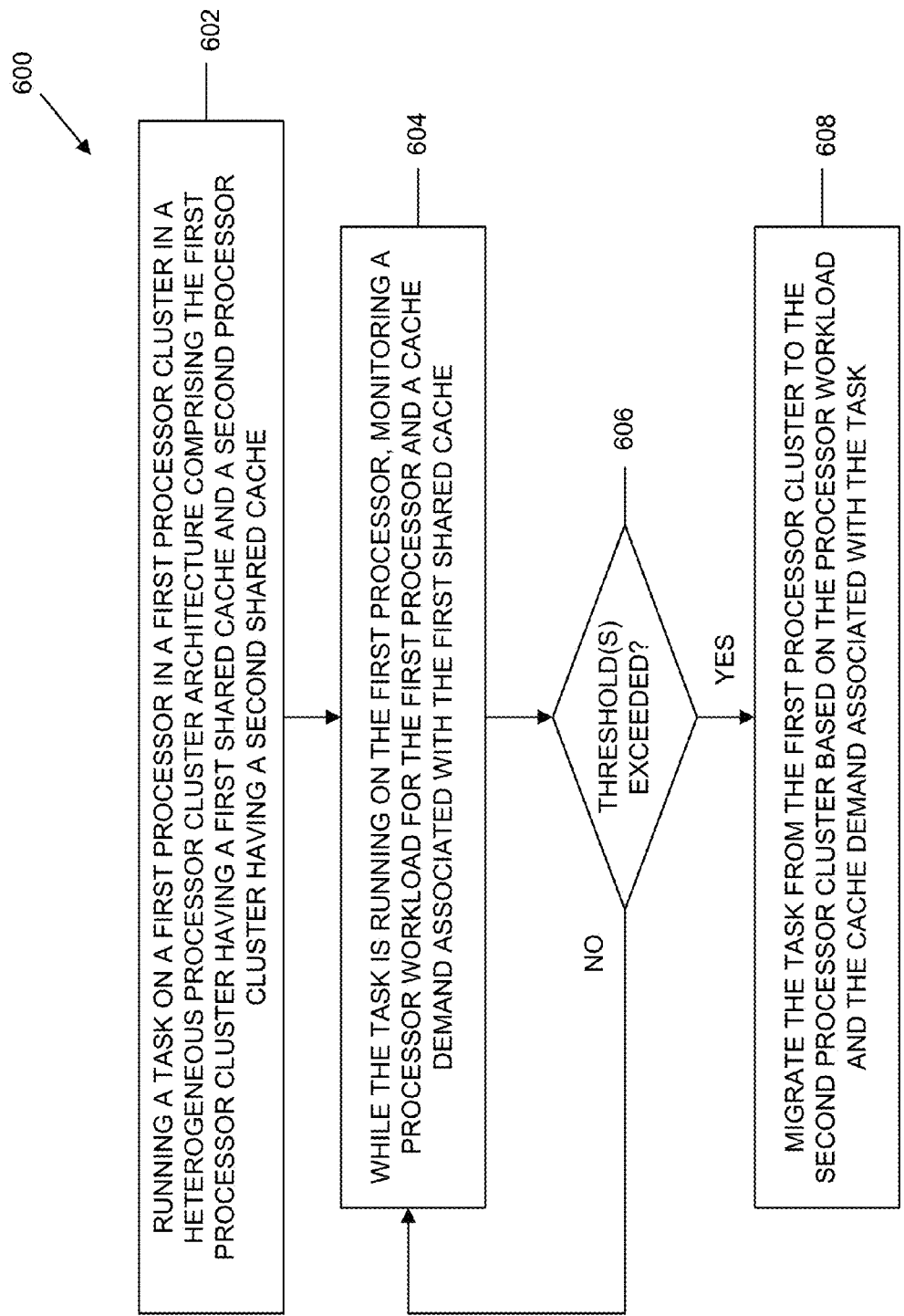
FIG. 6 is a flowchart illustrating an embodiment of a method for migrating tasks in a heterogeneous processor cluster architecture based on per-task CPU workload and cache demand.

FIG. 6 is a flowchart illustrating an embodiment of a method 600 for migrating tasks in the heterogeneous process cluster architecture of system 100 based on CPU workload and cache demand. It should be appreciated that one or more aspects of the method 600 may be implemented by scheduler 140, task migration component 150, and/or by an operating system. At block 602, a task is running on one of the processors in a first processor cluster (e.g., CPU 108 in processor cluster 102). At block 604, while the task is finning on CPU 108, the processor workload for CPU 108 may be monitored, as well as cache demand associated with shared cache 112. At block 606, the scheduler 140 may compare the processor workload and the cache demand to one or more associated thresholds. In an embodiment, the thresholds may be configured as in table 300 (FIG. 3). If one or more thresholds are exceeded (decision block 606), the system 100 may determine that the task is to be migrated (block 608) from the processor cluster 102 to a second processor cluster (e.g., cluster 104—FIG. 1). If no thresholds are exceeded, flow may return to block 604 for further monitoring of the processor workload and cache demand.

Figure 7:
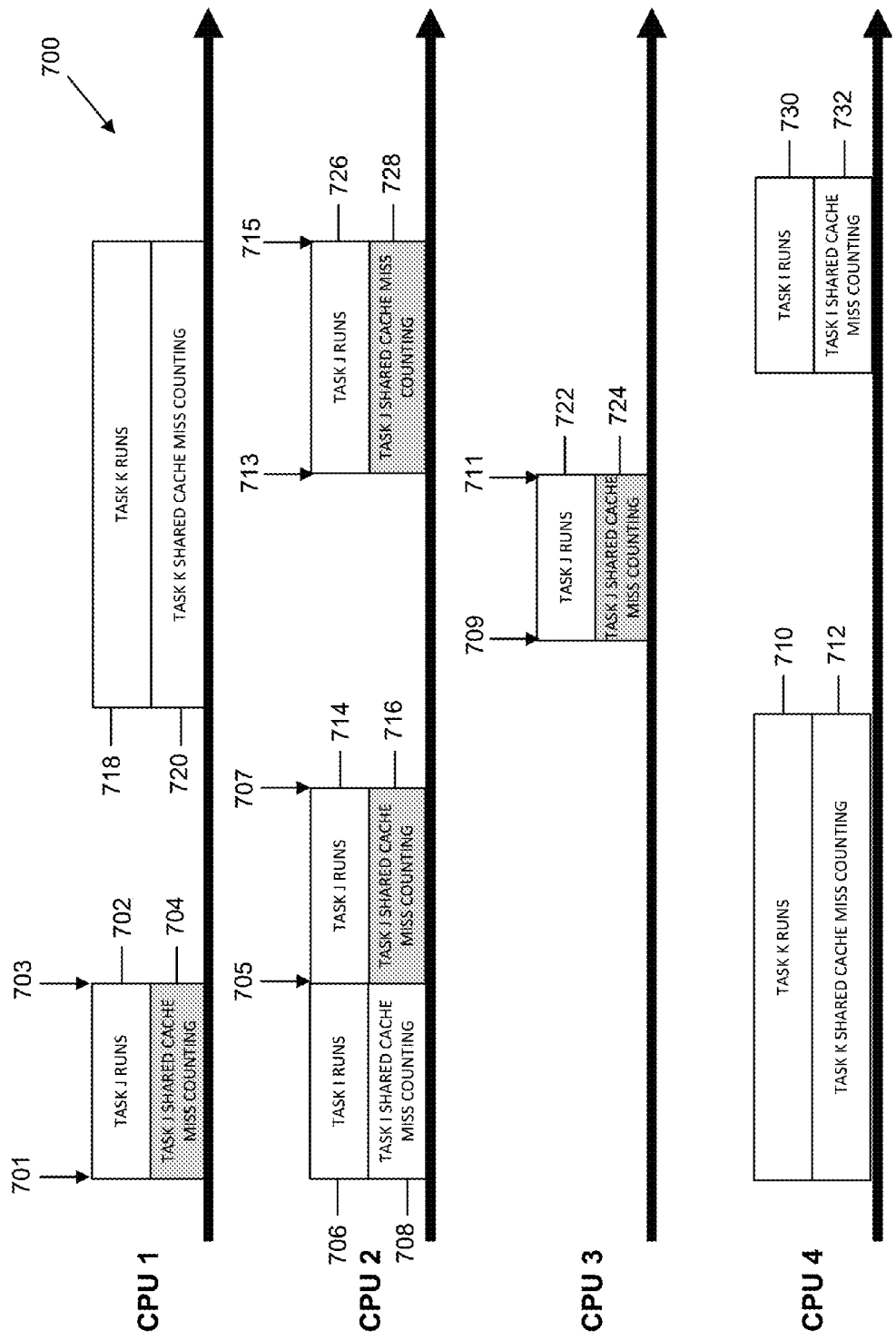
FIG. 7 illustrates another embodiment of task migration between four exemplary cores based on per-task cache miss profiles.

Referring to FIG. 7, in another embodiment, an operating system (O/S) kernel may be configured to implement a per-task cache miss profile. The O/S may define specially-configured variables for each running task and track cache misses on a task-by-task basis. In an embodiment, the variables may comprise a task run time, a cache miss counter, and a cache ratio per second (i.e., cache miss counter/task run time). The task run time variable comprises the total sum of the run time for a given task. The cache miss counter comprises the total sum of cache misses for a given task. FIG. 7 illustrates an exemplary method of determining per-task cache miss ratio based on readings from per-CPU cache miss counters, such as counters 408 and 412 (FIG. 4).

Along the x-axis timeline, a task j begins running on CPU 1 (block 702) while a task i (block 706) and a task k (block 710) begin running on CPU 2 and CPU 4, respectively. As tasks i, j, and k are running, the task run time and the cache miss for each corresponding core are tracked. Block 704 illustrates the cache miss counter for task j, which may be calculated by, for example, reading a shared miss counter for CPU 1 (e.g., counters 408 and 412 in FIG. 4 but not shared miss counter 401) at time 701 and 703. At time 703, task j may be reallocated (migrated) to CPU 2 because of any reasons in the scheduler (e.g., CPU 1 experiencing a higher temperature). While task j runs in CPU 2, the cache miss ration for task j may be calculated based on readings from the shared cache miss counter for CPU 2 instead of that for CPU 1. In a similar manner, the overall cache miss trend may be accumulated based on the counter reading of CPU 1 (a time duration from 701 to 703), CPU 2 (a time duration from 705 to 707), CPU 3 (a time duration from 709 to 711), and CPU 4 (a time duration from 730 to 732). The overall cache miss ratio calculated for task j may be used as an input to a scheduling decision (e.g., cache demand data 204 in FIG. 2, block 604 in FIG. 6, task types 2, 3, and 4 in FIG. 5).

Figure 8:
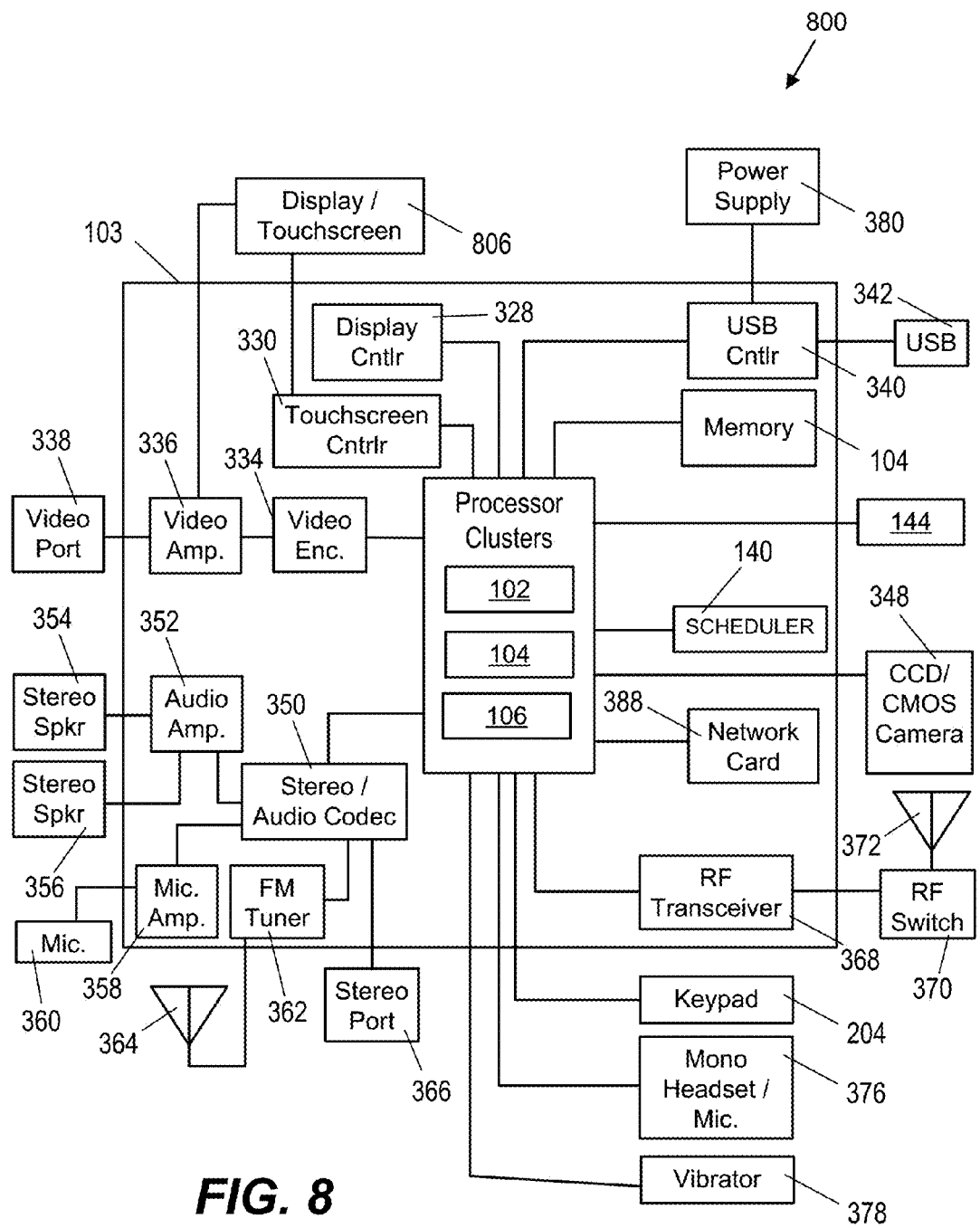
FIG. 8 illustrates the systems and methods of FIGS. 1-7 incorporated in an exemplary portable computing device (PCD).

The system 100 may be incorporated into any desirable computing system. FIG. 8 illustrates the system 100 incorporated in an exemplary portable computing device (PCD) 800. A system-on-chip (SoC) 103 may include the scheduler 140 and the processor clusters 102, 104, and 106 comprising the heterogeneous processor cluster architecture. A display controller 328 and a touch screen controller 330 may be coupled to one or more of the processor clusters. In turn, the touch screen display 806 may be external to the on-chip system 103 and may be coupled to the display controller 328 and the touch screen controller 330.

FIG. 8 further shows that a video encoder 334, e.g., a phase alternating line (PAL) encoder, a sequential color a memoire (SECAM) encoder, or a national television system(s) committee (NTSC) encoder, is coupled to one or more of the processor clusters 102, 104, and 106. Further, a video amplifier 336 is coupled to the video encoder 334 and the touch screen display 806. Also, a video port 338 is coupled to the video amplifier 336. As shown in FIG. 8, a universal serial bus (USB) controller 340 is coupled to one or more of the processor clusters. Also, a USB port 342 is coupled to the USB controller 340. Memory 144 and a subscriber identity module (SIM) card 346 may also be coupled to the processor cluster(s).

Further, as shown in FIG. 8, a digital camera 348 may be coupled to the processor cluster(s). In an exemplary aspect, the digital camera 348 is a charge-coupled device (CCD) camera or a complementary metal-oxide semiconductor (CMOS) camera.

As further illustrated in FIG. 8, a stereo audio coder-decoder (CODEC) 350 may be coupled to the processor cluster(s). Moreover, an audio amplifier 352 may be coupled to the stereo audio CODEC 350. In an exemplary aspect, a first stereo speaker 354 and a second stereo speaker 356 are coupled to the audio amplifier 352. A microphone amplifier 358 may be also coupled to the stereo audio CODEC 350. Additionally, a microphone 360 may be coupled to the microphone amplifier 358. In a particular aspect, a frequency modulation (FM) radio tuner 362 may be coupled to the stereo audio CODEC 350. Also, an FM antenna 364 is coupled to the FM radio tuner 362. Further, stereo headphones 366 may be coupled to the stereo audio CODEC 350.

FIG. 8 further illustrates that a radio frequency (RF) transceiver 368 may be coupled to the processor cluster(s). An RF switch 370 may be coupled to the RF transceiver 368 and an RF antenna 372. A keypad 204, a mono headset with a microphone 376, and a vibrator device 378 may be coupled to the processor cluster(s).

FIG. 8 also shows that a power supply 380 may be coupled to the on-chip system 103. In a particular aspect, the power supply 380 is a direct current (DC) power supply that provides power to the various components of the PCD 800 that require power. Further, in a particular aspect, the power supply is a rechargeable DC battery or a DC power supply that is derived from an alternating current (AC) to DC transformer that is connected to an AC power source.

FIG. 8 further indicates that the PCD 800 may also include a network card 388 that may be used to access a data network, e.g., a local area network, a personal area network, or any other network. The network card 388 may be a Bluetooth network card, a WiFi network card, a personal area network (PAN) card, a personal area network ultra-low-power technology (PeANUT) network card, a television/cable/satellite tuner, or any other network card well known in the art. Further, the network card 388 may be incorporated into a chip, i.e., the network card 388 may be a full solution in a chip, and may not be a separate network card 388.

Referring to FIG. 8, it should be appreciated that the memory 144, the RAM card 105, touch screen display 806, the video port 338, the USB port 342, the camera 348, the first stereo speaker 354, the second stereo speaker 356, the microphone 360, the FM antenna 364, the stereo headphones 366, the RF switch 370, the RF antenna 372, the keypad 374, the mono headset 376, the vibrator 378, and the power supply 380 may be external to the on-chip system 103.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, NAND flash, NOR flash, M-RAM, P-RAM, R-RAM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for scheduling tasks in a heterogeneous processor cluster architecture in a portable computing device, the method comprising:
running a task on a first processor in a first processor cluster in a heterogeneous processor cluster architecture comprising the first processor cluster having a first shared cache and a second processor cluster having a second shared cache, one of the first processor cluster and second processor cluster having higher performance and a larger shared cache than the other of the first processor cluster and second processor cluster;
while the task is running on the first processor in the first processor cluster, monitoring a processor workload for the first processor and a cache demand for the task, the cache demand associated with the first shared cache;
calculating a weighted sum of the processor workload and the cache demand;
comparing the weighted sum with a threshold;
determining, based on a result of comparing the weighted sum with the threshold, whether to perform a task migration; and
migrating the task to the second processor cluster in response to a determination to perform a task migration.

2. The method of claim 1, wherein the first processor comprises a dedicated cache miss counter in communication with the first shared cache.

3. The method of claim 1, wherein each processor in the first and second processor clusters comprises a dedicated cache miss counter for receiving cache miss signals from the corresponding first and second shared cache in response to read and write operations from the corresponding processor.

4. The method of claim 3, wherein the cache miss signals from the dedicated cache miss counters for each processor is used to determine a per-task cache miss ratio.

5. The method of claim 1, wherein the processor workload comprises information related to one or more of a number of instructions per clock, a number of instructions per unit time, a frequency level, and a processor active duration percentage, and the cache demand input comprises information related to one or more of a number of cache misses, a number of cache accesses, a cache miss rate, and a processor stall time or a number of processor stalls due to cache misses.

6. A system for scheduling tasks in a heterogeneous processor cluster architecture in a portable computing device, the system comprising:
means for running a task on a first processor in a first processor cluster in a heterogeneous processor cluster architecture comprising the first processor cluster having a first shared cache and a second processor cluster having a second shared cache, one of the first processor cluster and second processor cluster having higher performance and a larger shared cache than the other of the first processor cluster and second processor cluster;
means for monitoring a processor workload for the first processor and a cache demand for the task associated with the first shared cache while the task is running on the first processor in the first processor cluster, the processor workload including processor loading and processing latency;
means for calculating a weighted sum of the processor workload and the cache demand;

means for comparing the weighted sum with a threshold;
means for determining, based on a result of comparing the weighted sum with the threshold, whether to perform a task migration; and
means for migrating the task to the second processor cluster in response to a determination to perform a task migration.

7. The system of claim 6, further comprising: means for counting a number of cache misses involving read and write operations to the first shared cache.

8. The system of claim 6, wherein each processor in the first and second processor clusters comprises: means for receiving cache miss signals from the corresponding first and second shared cache in response to read and write operations from the corresponding processor.

9. The system of claim 8, further comprising: means for determining a per-task cache miss ratio based on the received cache miss signals.

10. The system of claim 6, wherein the means for migrating the task to the second processor cluster based on the processor workload and the cache demand comprises: means for determining that a cache miss rate for the first processor exceeds a threshold.

11. The system of claim 6, wherein the processor workload comprises information related to one or more of a number of instructions per clock, a number of instructions per clock, a number of instructions per unit time, a frequency level, and a processor active duration percentage, and the cache demand input comprises information related to one or more of a number of cache misses, a number of cache accesses, a cache miss rate, and a processor stall time or a number of processor stalls due to cache misses.

12. A computer program embodied in a non-transitory computer-readable medium and executable by a processor for scheduling tasks in a heterogeneous processor cluster architecture in a portable computing device, the computer program comprising logic configured to:
execute a task on a first processor in a first processor cluster in a heterogeneous processor cluster architecture comprising the first processor cluster having a first shared cache and a second processor cluster having a second shared cache, one of the first processor cluster and second processor cluster having higher performance and a larger shared cache than the other of the first processor cluster and second processor cluster;
monitor a processor workload for the first processor and a cache demand for the task associated with the first shared cache while the task is running on the first processor in the first processor cluster;
calculate a weighted sum of the processor workload and the cache demand;
compare the weighted sum with a threshold;
determine, based on a result of comparing the weighted sum with the threshold, whether to perform a task migration; and
migrate the task to the second processor cluster in response to a determination to perform a task migration.

13. The computer program of claim 12, wherein the first processor comprises a dedicated cache miss counter in communication with the first shared cache.

14. The computer program of claim 12, wherein each processor in the first and second processor clusters comprises a dedicated cache miss counter for receiving cache miss signals from the corresponding first and second shared cache in response to read and write operations from the corresponding processor.

15. The computer program of claim 14, further comprising: logic configured to determine a per-task cache miss ratio based on the cache miss signals from the dedicated cache miss counters.

16. The computer program of claim 12, wherein the processor workload comprises information related to one or more of a number of instructions per clock, a number of instructions per unit time, a frequency level, and a processor active duration percentage, and the cache demand input comprises information related to one or more of a number of cache misses, a number of cache accesses, a cache miss rate, and a processor stall time or a number of processor stalls due to cache misses.

17. A system for scheduling tasks in a heterogeneous processor cluster architecture in a portable computing device, the system comprising:
a first processor cluster comprising a first shared cache;
a second processor cluster comprising a second shared cache, one of the first processor cluster and second processor cluster having higher performance and a larger shared cache than the other of the first processor cluster and second processor cluster; and
a controller in communication with the first and second processor clusters for performing task migration between the first and second processor clusters, the controller configured to:
initiate execution of a task on a first processor in the first processor cluster;
monitor a processor workload for the first processor and a cache demand for the task associated with the first shared cache while the task is running on the first processor in the first processor cluster;
calculate a weighted sum of the processor workload and the cache demand;
compare the weighted sum with a threshold;
determine, based on a result of comparing the weighted sum with the threshold, whether to perform a task migration; and
migrate the task to the second processor cluster in response to a determination to perform a task migration.

18. The system of claim 17, wherein the first processor comprises a dedicated cache miss counter in communication with the first shared cache.

19. The system of claim 17, wherein each processor in the first and second processor clusters comprises a dedicated cache miss counter for receiving cache miss signals from the corresponding first and second shared cache in response to read and write operations from the corresponding processor.

20. The system of claim 19, wherein the controller is further configured to determine a per-task cache miss ratio based on the cache miss signals received from the dedicated cache miss counters.

21. The system of claim 17, wherein the processor workload comprises information related to one or more of a number of instructions per clock, a number of instructions per unit time, a frequency level, and a processor active duration percentage, and the cache demand input comprises information related to one or more of a number of cache misses, a number of cache accesses, a cache miss rate, and a processor stall time or a number of processor stalls due to cache misses.

22. The system of claim 21, wherein the processor cores comprise one of a graphics processing unit (GPU) and a central processing unit (CPU).

23. The system of claim 17, wherein the portable communication device comprises one of a smart phone and a tablet computer.

\* \* \* \* \*